United States Patent
Tsunoda

(10) Patent No.: US 7,394,490 B2
(45) Date of Patent: Jul. 1, 2008

(54) IMAGE SCANNING APPARATUS

(75) Inventor: Naoki Tsunoda, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 706 days.

(21) Appl. No.: 10/801,596

(22) Filed: Mar. 17, 2004

(65) Prior Publication Data
US 2004/0233292 A1 Nov. 25, 2004

(30) Foreign Application Priority Data
Mar. 18, 2003 (JP) .............................. 2003-074534
Feb. 27, 2004 (JP) .............................. 2004-055454

(51) Int. Cl.
H04N 5/76 (2006.01)
H04N 5/225 (2006.01)
H04N 5/222 (2006.01)

(52) U.S. Cl. ............... 348/231.3; 348/231.4; 348/207.1; 348/333.02

(58) Field of Classification Search ............... 348/231.3, 348/231.4, 333.11, 333.12
See application file for complete search history.

(56) References Cited

U.S. PATENT DOCUMENTS 6,169,854 B1 * 1/2001 Hasegawa et al. ............. 396/56
6,563,542 B1 * 5/2003 Hatakenaka et al. ... 348/333.02
6,952,229 B1 * 10/2005 Takahashi et al. ...... 348/333.02
2002/0018138 A1 * 2/2002 Yoshiro .................. 348/333.05
2002/0171747 A1 * 11/2002 Niikawa et al. ........ 348/333.01
2003/0103148 A1 * 6/2003 Ejima et al. .............. 348/231.3

FOREIGN PATENT DOCUMENTS
JP    2002-158953    5/2002

OTHER PUBLICATIONS

U. S. Appl. No. 10/026,624, filed Dec. 27, 2001, Tsunoda.
U. S. Appl. No. 10/801,596, filed Mar. 17, 2004, Tsunoda.

* cited by examiner

Primary Examiner—David Ometz
Assistant Examiner—Luong T. Nguyen
(74) Attorney, Agent, or Firm—Oblon, Spivak, McClelland, Maier & Neustadt, P.C.

(57) ABSTRACT

An image scanning apparatus has such a configuration that an item and a content of additional information such as previously set character information, sound information recorded in the image scanning apparatus and character information inputted in the image scanning apparatus are displayed unitarily and a user selects and updates freely the displayed item and the content of the additional information.

6 Claims, 14 Drawing Sheets

FIG. 2

```
//2002.10.07
//**0 SJIS
//**1[1] COMPANY NAME
STOCK COMPANY R
A COMPANY
B COMPANY
C COMPANY
D COMPANY
E COMPANY
F COMPANY
G COMPANY
H COMPANY
//**2[2] BELONGING DIVISION
○○○ DIVISION
○○○ DIVISION     STOCK COMPANY R
//**3[3] BELONGING DEPARTMENT
△△△ DIVISION
× × × PROMOTION SECTION
//**4[4] END SERVICE
aaa
bbb
//**5[5] ENDS
TSUNODA
NAGAO
OKA
HASHIMOTO
FUJISAWA
WATANABE
SUGIURA
MAKI
SANNO
TSUJI
MIYAKAWA
NOZAWA
KAJIYAMA
KANEHIRO
```

FIG. 3A
FIG. 3
| FIG. 3A |
| FIG. 3B |
| FIG. 3C |
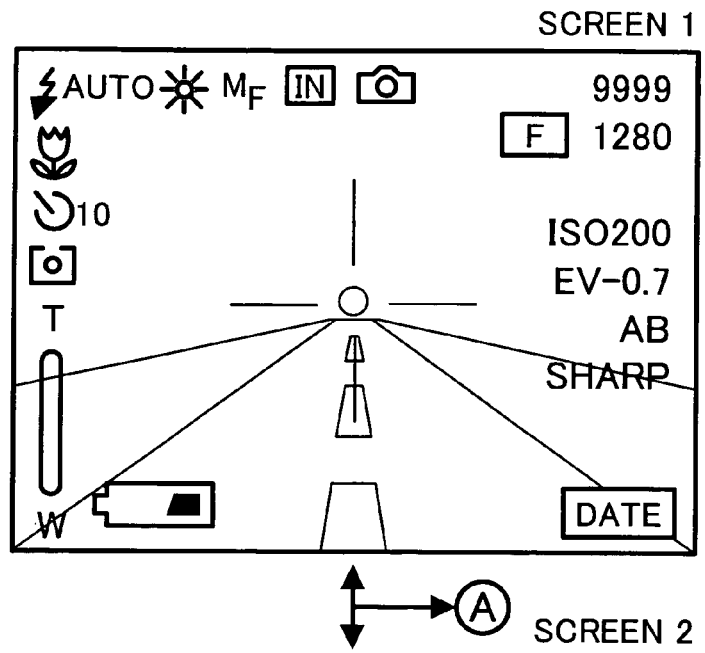
SCREEN 1
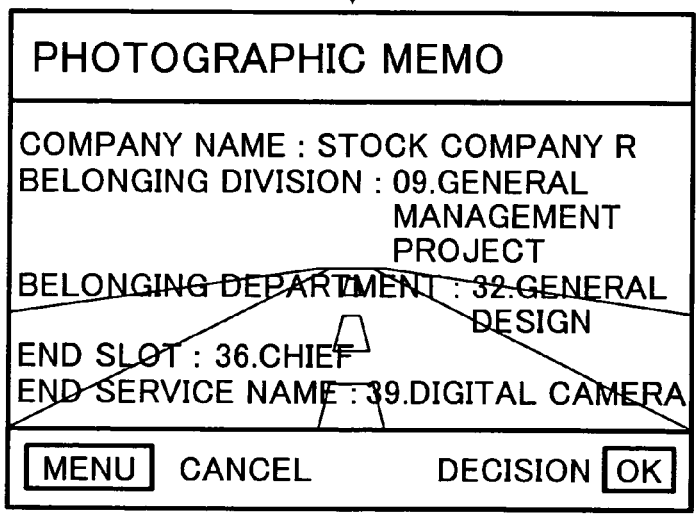
SCREEN 2
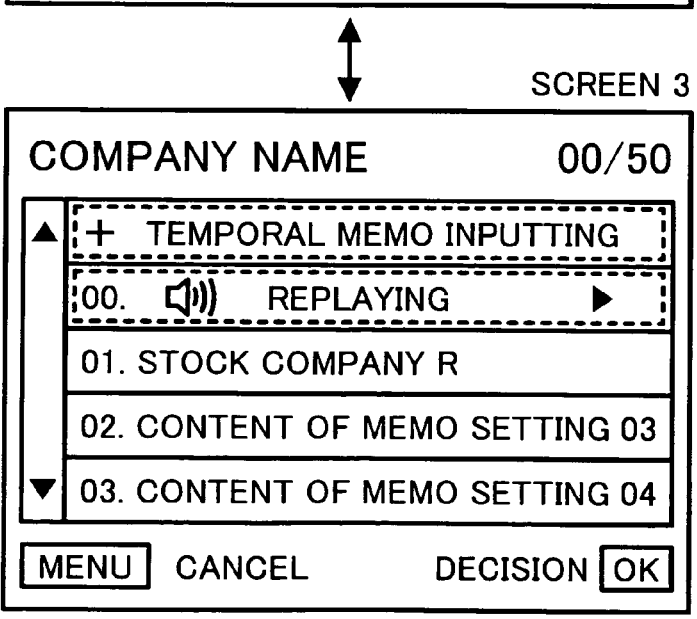
SCREEN 3

FIG. 4AA
FIG. 4A
| FIG. 4AA |
| FIG. 4AB |
SCREEN 1
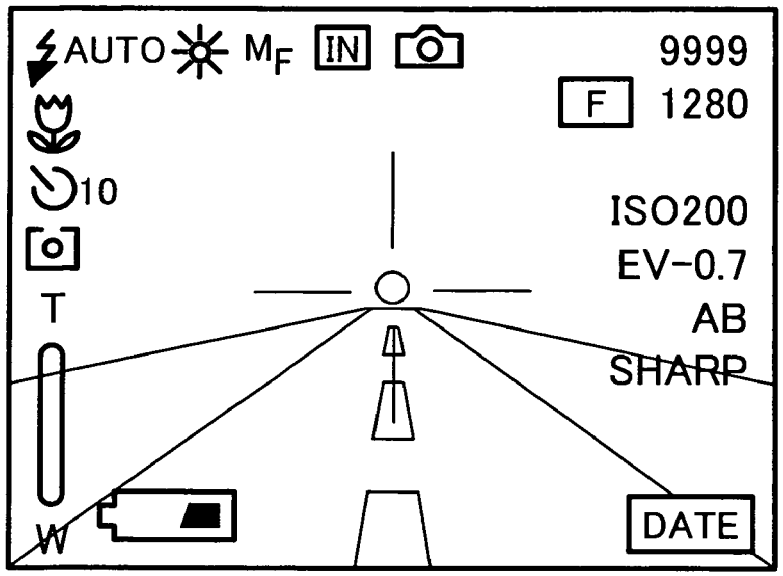
SCREEN 2
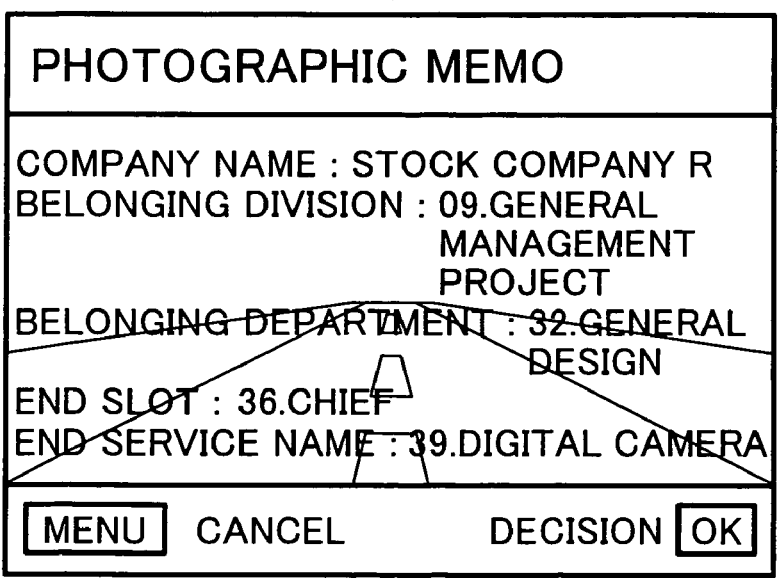

FIG. 4AB
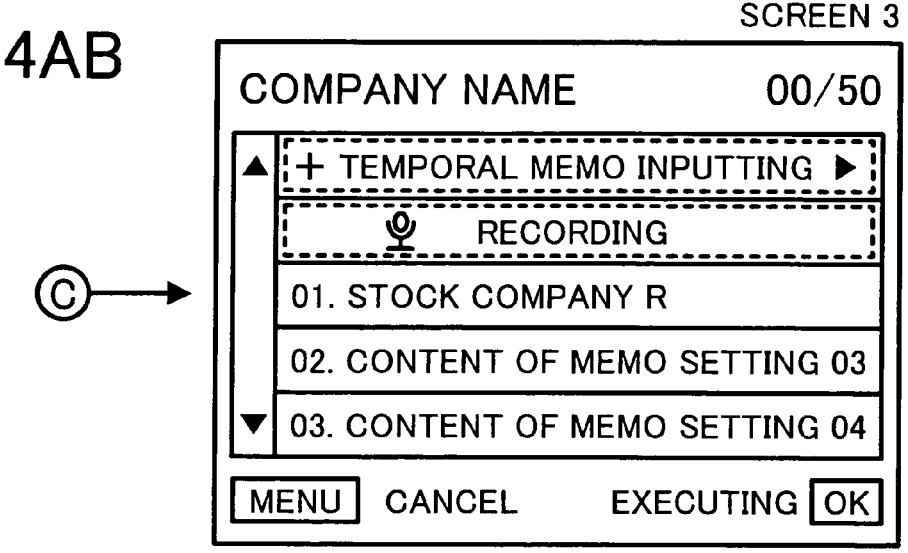
SCREEN 3
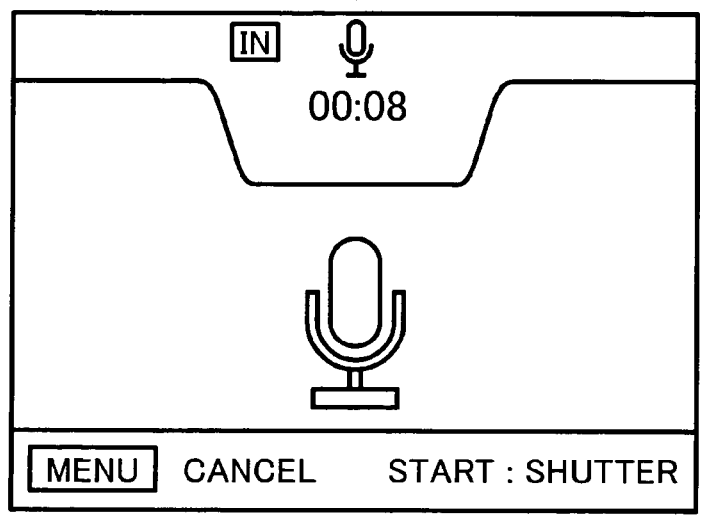
SCREEN 4
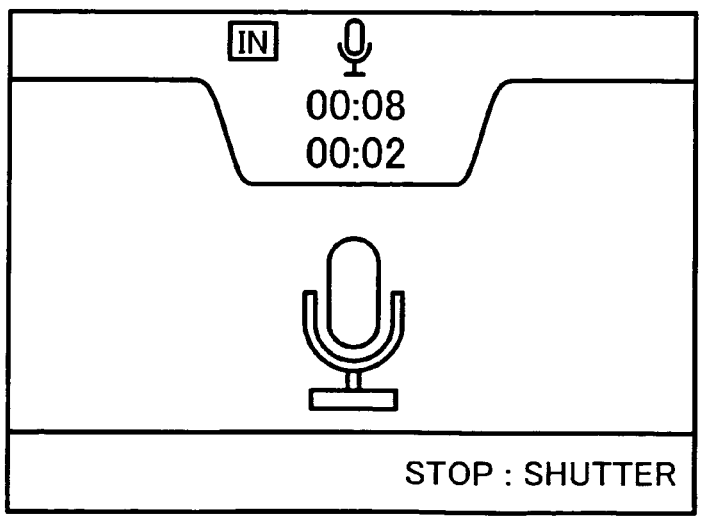
SCREEN 5

SCREEN 6

| COMPANY NAME | 00/50 |

▲ | + TEMPORAL MEMO INPUTTING
| 00. 🔊 REPLAYING ▶
| 01. STOCK COMPANY R
| 02. CONTENT OF MEMO SETTING 03
▼ | 03. CONTENT OF MEMO SETTING 04

| MENU | CANCEL | DECISION | OK |

SCREEN 7

[IN] 🎤
00:08

🔊

| MENU | CANCEL | START : SHUTTER |

Ⓓ

FIG. 4BB
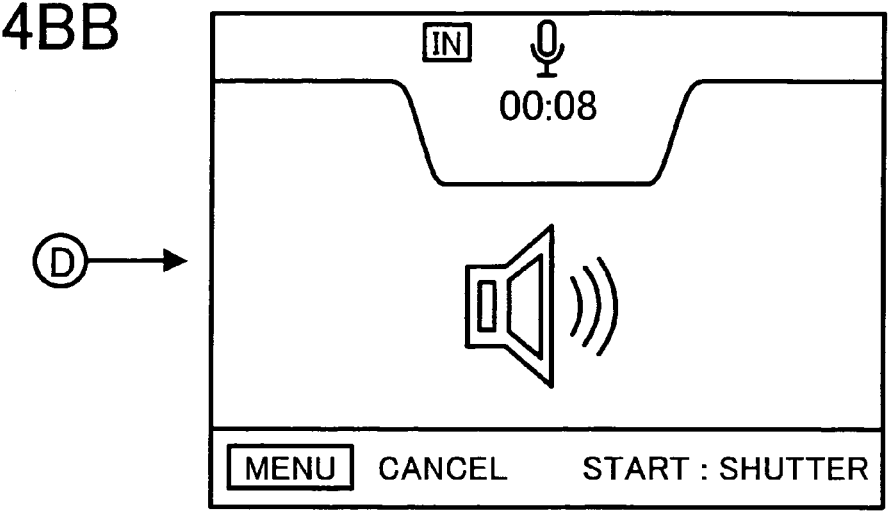
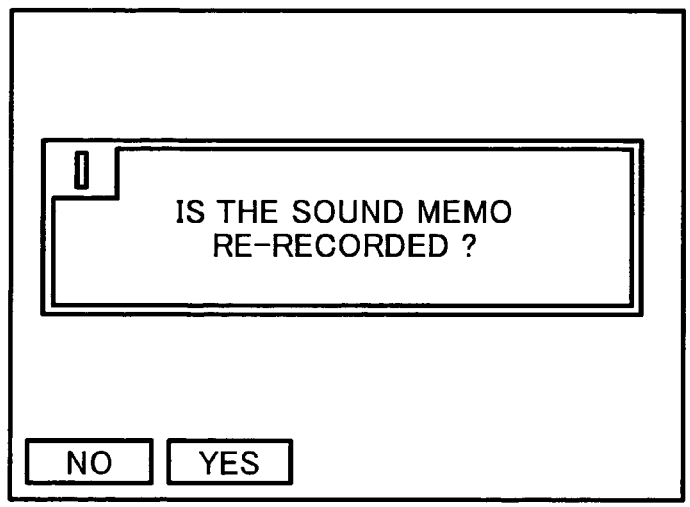
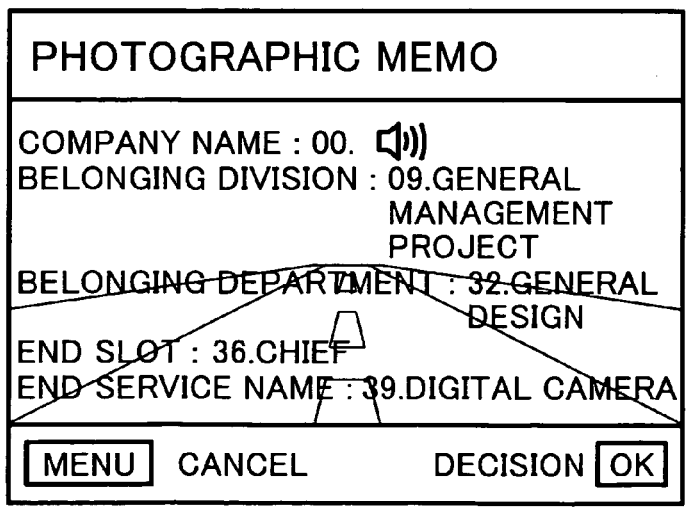

FIG. 5A
FIG. 5
FIG. 5A
FIG. 5B
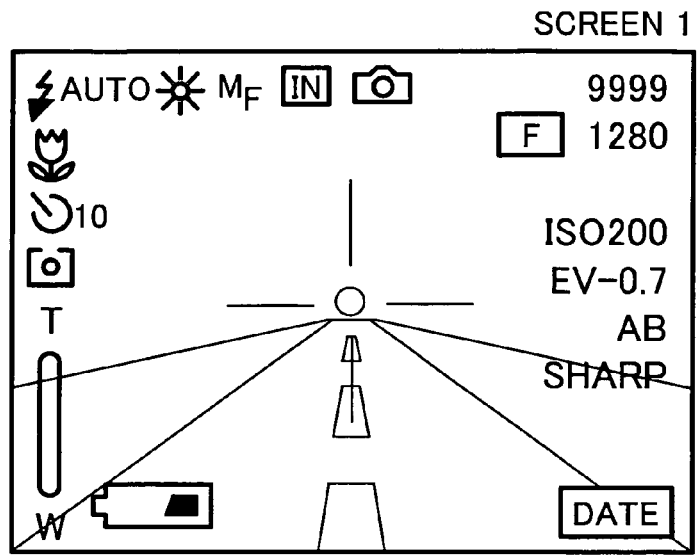
SCREEN 1
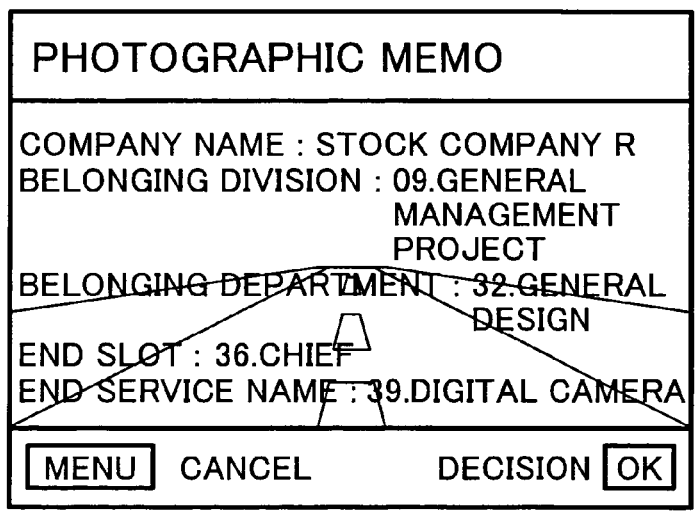
SCREEN 2
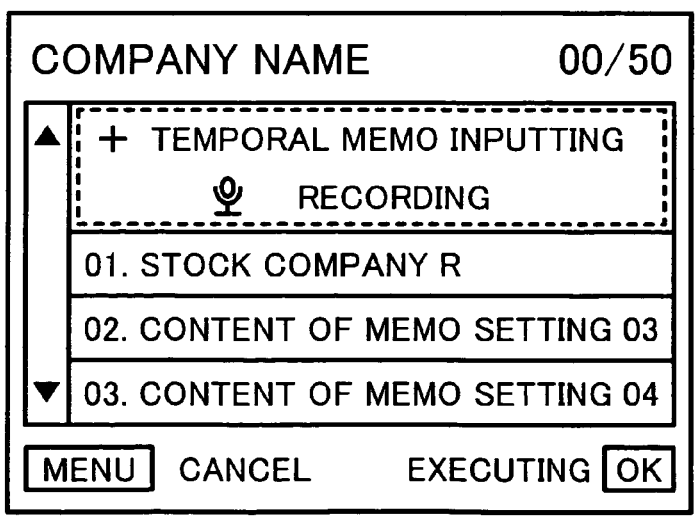
SCREEN 3

FIG. 5B
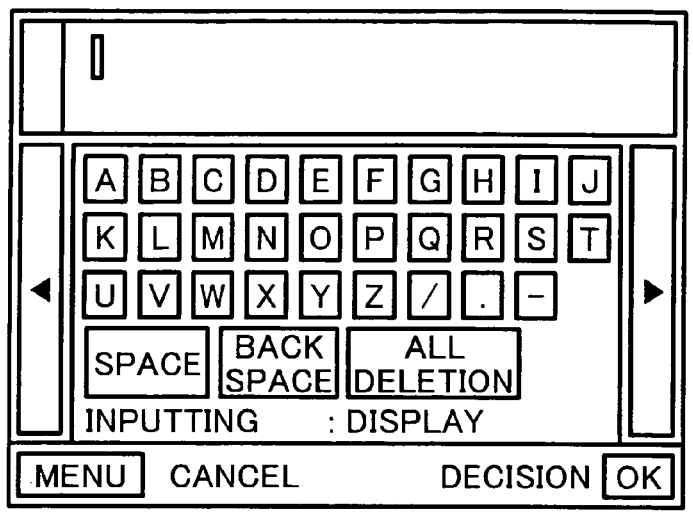
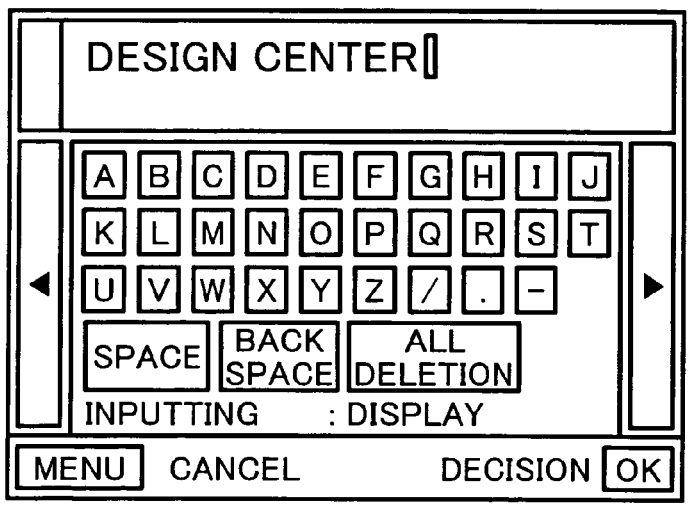
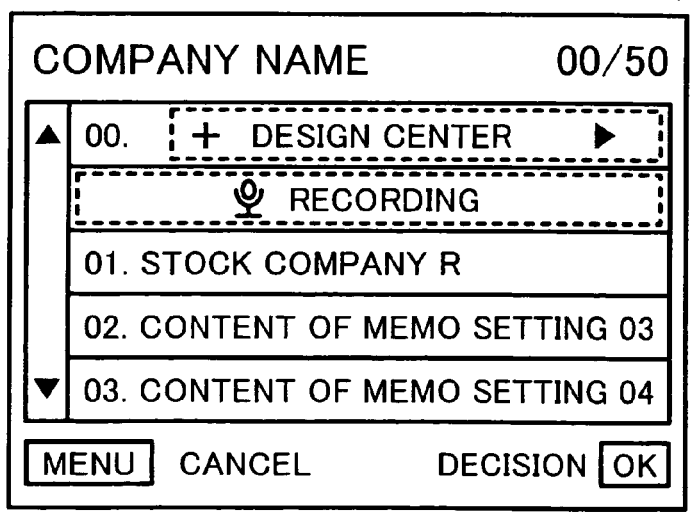

FIG. 6
| FIG. 6A |
| FIG. 6B |
FIG. 6A
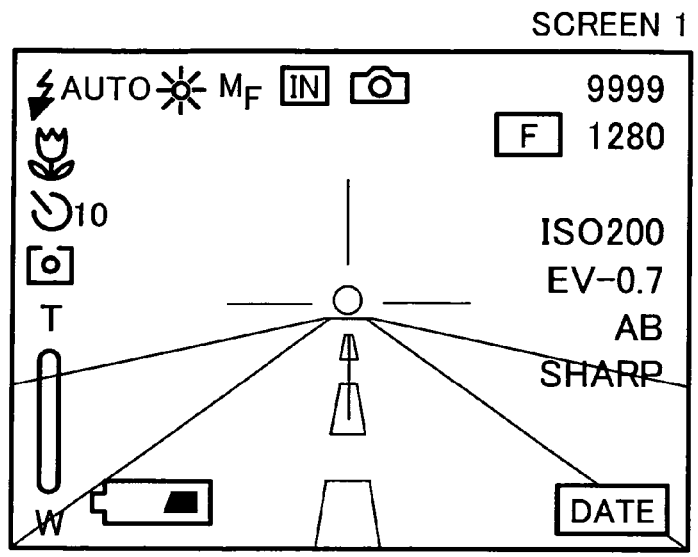
SCREEN 1
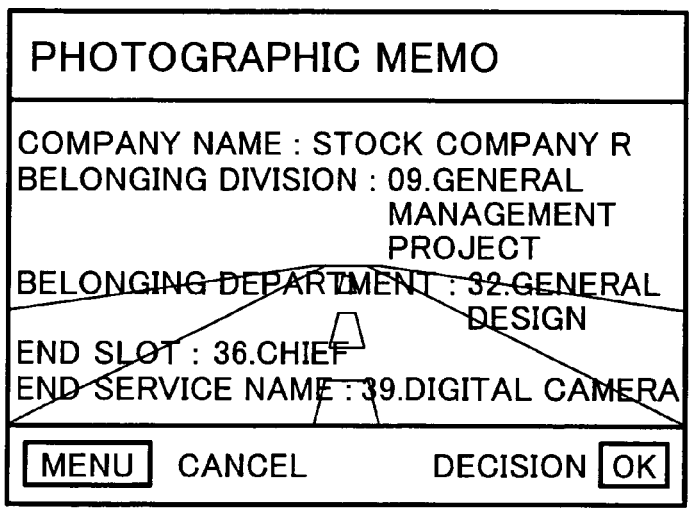
SCREEN 2
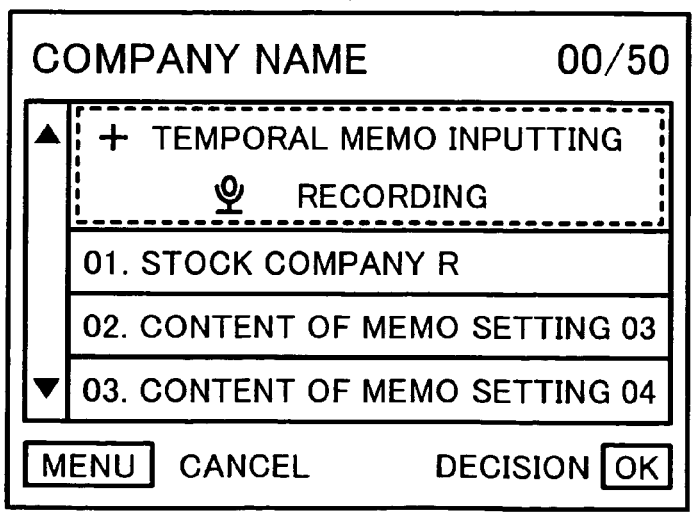
SCREEN 3

IMAGE SCANNING APPARATUS

BACKGROUND OF THE INVENTION

1. Field of the Invention

The present invention relates to an image scanning apparatus such as a digital camera and a digital movie.

2. Description of the Prior Art

Generally, in an image scanning apparatus such as a digital camera and a digital movie, a various of proposals have been made with respect to a technology for adding character data as an additional information to image data of a photographed image. For example, if a photography is performed by a digital camera, it is considered that a various of information are recorded together with a photographed image, the information recorded with the photography are transmitted to a personal computer (PC) or the like and are used as information for carrying out various after-processing.

Additionally, there is listed Japanese Patent Laid-Open 2002-158953 proposed by the Applicant or the like as prior art. The reference discloses that a digital camera inputs a photographic list including one or more cut names of a recorded object to be recorded, through an inputting means for inputting the photographic list, displays the cut name included in the photographic list on a displaying part and takes a photograph while confirming the cut names of the photographic list, and the inputting means includes web browsing means for brewing a home page of a web server to be connected and for down-loading the photographic list on the home page.

However, there is a problem in the operationality in the conventional digital camera for the reason that an item and a content of the additional information such as previously set character information, sound information recorded in the digital camera and character information inputted in the digital camera cannot be displayed unitarily and cannot be selected and updated.

SUMMARY OF THE INVENTION

It is therefore an object of the present invention to provide an image scanning apparatus capable of displaying unitarily or in one screen additional information for a user, selecting, updating the additional information and increasing the operationality of the user.

To attain the above object, an image scanning apparatus for scanning image data according to the present invention comprises an image data scanning section and a display selecting section for displaying unitarily, an item of additional information to be added to image data taken-in by the image data scanning section and a content corresponding to the item, selecting the displayed additional information and updating the selected additional information.

The present invention makes it possible to display unitarily the item and the content of the additional information added to an image, such as previously set character information, sound information recorded in the image scanning apparatus and character information inputted in the image scanning apparatus to select and update freely the displayed item and content of the additional information by a user, so that the operationality of the user can be very enhanced.

BRIEF DESCRIPTION OF THE DRAWINGS

FIG. 2 is a view showing one example of a recording format of previously set character data.

FIG. 4A is a view showing a portion of an operational flow of inputting direct inputting sound data.

FIG. 4B is a view showing a portion of the operational flow connected with the flow shown in FIG. 4A.

FIG. 5 is a view showing an operational flow of inputting direct inputting character data.

DETAILED DESCRIPTION OF THE PREFERRED EMBODIMENTS

Figure 1:
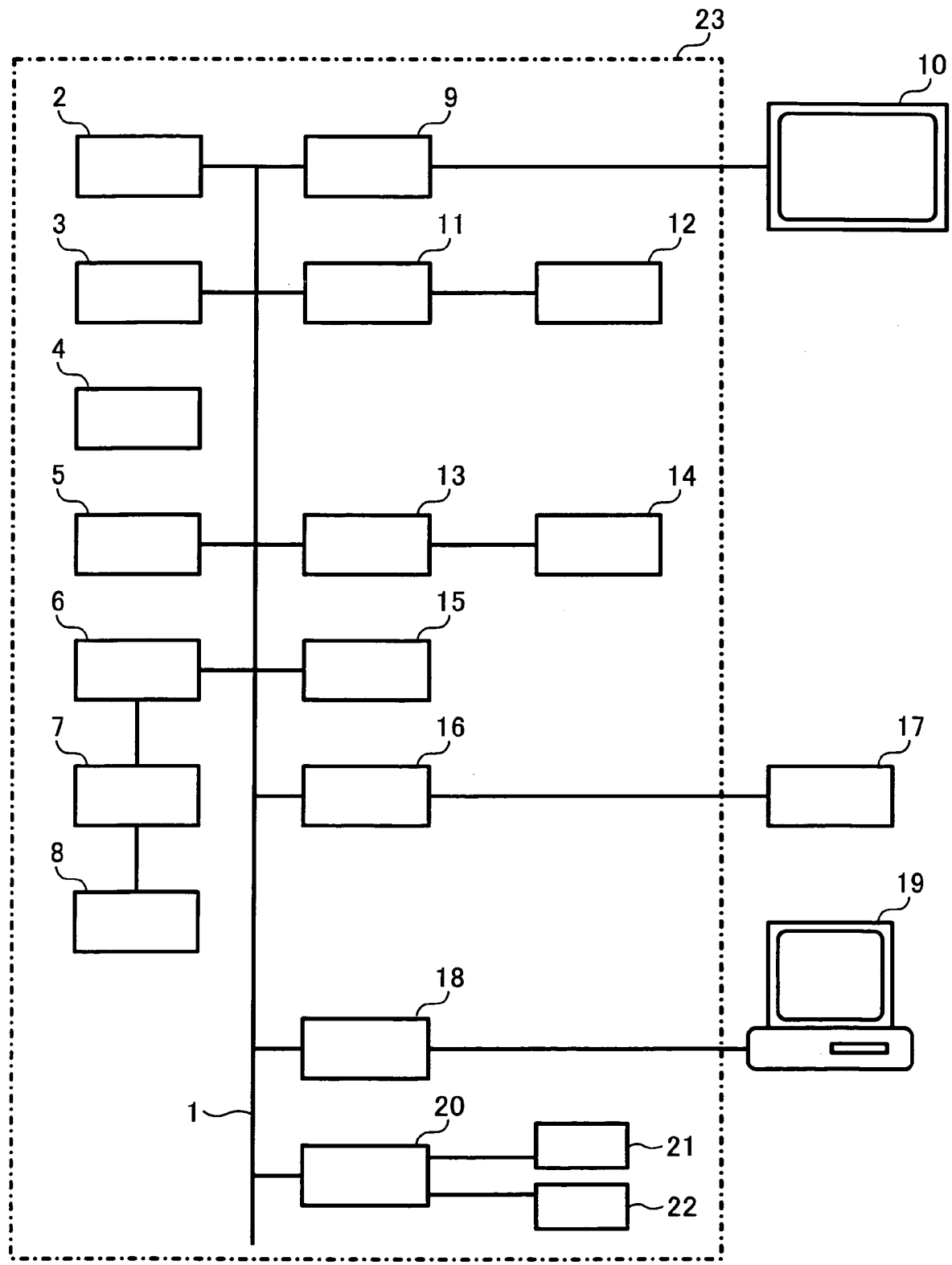
FIG. 1 is a block view for explaining a structure of a hard ware of a digital camera in one embodiment of the present invention.

Some embodiments of the present invention will be explained with reference to the accompanying drawings below.

An image scanning apparatus for taking-in image data, according to the present invention, or a digital camera 23 is illustrated in FIGS. 1 and 7 to 9. The digital camera 23 is composed of a system bath 1, and a CPU 2, a ROM 3 having therein a program., a RAM 4 having a work area of the program or data, a built-in memory 5 housing a photographed image file, a system file, a data file and so on, a key control part I/F 6 and a key control part 7, which are connected with the system bath 1, respectively.

The digital camera 23 comprises an image data scanning section and a display selecting section. The display selecting section includes the CPU 2, a hard key unit 8 connected with the key control part 7, a LCD control part 11 connected with the ROM 3 for converting information on the RAM 4 into a signal for displaying a LCD and outputting the signal, and a LCD unit 12 connected with the LCD control part 11. The image data scanning section includes a lens unit 14 on which one or more lenses, a drive mechanism for the lens and a CCD and so on are mounted, and a release shutter 31(see FIG. 9).

The key control part 7 detects any key of the hard key unit 8. The key control part I/F 6 carries out an exchange of information between the CPU 2 and the key control part 7.

The digital camera 23 also includes a video control part 9 for converting image information on the RAM 4 into a video signal and outputting the video signal to a television 10 disposed outside the digital camera 23, a camera control part 13 for converting an image signal outputted from the CCD of the lens unit 14 into frame data such as RGB data, brightness (Y) data, color difference (Cr, Cb) data or the like and for caking out a necessary image processing, a control part 15 for compression and extension of an image to convert image data from the camera control part 13 into compression image data such as JPEG and into image data such as YUV by extension of the compression image data, a card control part 16 for controlling reading-out and writing-in of data of a SD card 17, a USB control part 18 for carrying out a USB connecting communication with a personal computer 19, and a sound control part 20 for controlling input and output of a sound with respect to a microphone 21 and a speaker 22.

Figure 7:
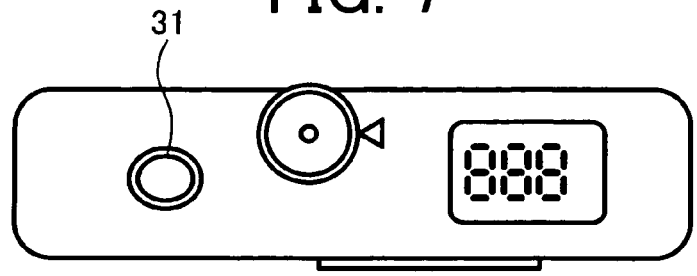
FIG. 7 is a top view of the digital camera according to the present invention
Figure 8:
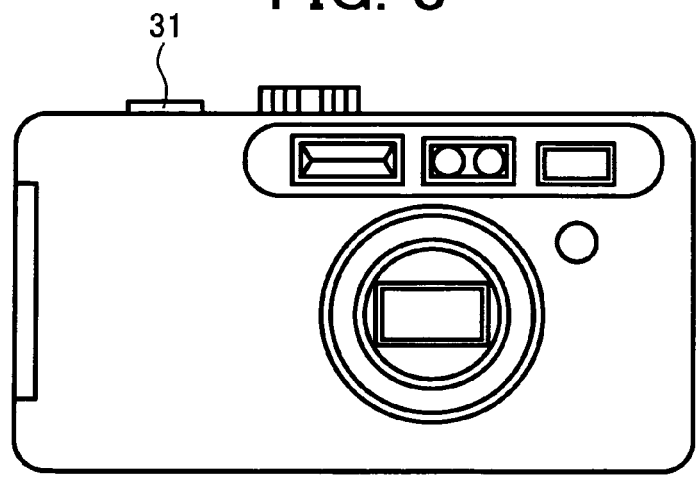
FIG. 8 is a front view of the digital camera.
Figure 9:
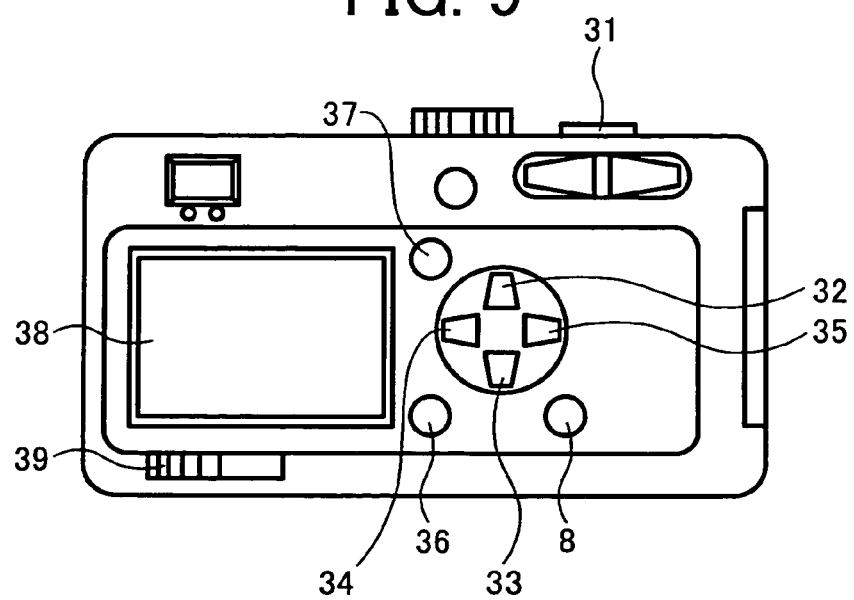
FIG. 9 is a back view of the digital camera.

In addition, the hard key unit 8 is composed of the release shutter 31, an upper key 32, a lower key 33, a left key 34, a right key 35, OK/memo function ON-OFF key 36, a menu key 37 and so on (see FIGS. 7 to 9).

Next, an entire operation of the digital camera 23 as described above will be explained.

A normal photograph of the digital camera 23 is carried out by press of the release shutter 31 of the hard key unit 8 by a user. An image is taken through the lenses of the lens unit 14 in the CCD of the lens unit 14 and the image is converted into an image signal in the CCD and the image signal is outputted from the CCD. The signal outputted from the CCD is converted into frame data of RGB data, brightness (Y) data, color difference (Cr, Cb) data or the like by the camera control part 13, after a required mage processing is carried out to converted data, and then the processed data are transferred to the RAM 4. The transferred image data are converted into compression image data based on the JPEG (Joint Photographic Experts Group), and then the converted data are transferred to the RAM 4 again. The compression image data stored in the RAM 4 pursuant to the JPEG, after a required header processing is carried out, are recorded through the built-in memory 5 and the card control part 16 on the SD card 17.

The digital camera 23 is also configured to add information regarding a photographed image, to image data regarding the image.

For example, previously set character data (first character data), which are character information that the user previously prepares and sets with a personal computer are recorded in the SD card 17, and the user can prepare additional information for adding the previously set character data to the image.

That is to say, the digital camera 23 loads on and reads in the RAM 4, the previously set character data stored in the SD card 17 when a power source is turned on and the camera is actuated. The previously set character data read in this way can be selected by means of the user. The previously set character data selected by the user are recorded through the built-in memory 5 or a recording memory or the card control part 16 on the SD card 17 together with the compression data as additional information when the required header processing is performed in the normal photography as described above.

The user is also capable of inputting directly information regarding an image from the digital camera 23 as additional information, other than the previously set character data, which are previously recorded and set on the SD card 17. Specifically, the digital camera 23 comprises a character memo function and a sound memo function, as a direct inputting function or memo function of the information. The user takes out directly direct inputting character data or second character data which is a character information and direct inputting sound data or sound data which is sound information from the digital camera 23 to acquire additional information of the image by use of the aforementioned character and sound memo functions.

In other words, in the character function, the user inputs any character information (direct inputting character data) by use of the hard key unit 8 or the like of the digital camera 23. Subsequently, when the user selects the direct inputting character data, the direct inputting character data are recorded through the built-in memory 5 or card control part 16 on the SD card 17 as the additional information together with the compression image data, in carrying out the required header processing in the normal photography as described above.

In the sound memo function, the user inputs any sound information (direct inputting sound data) by use of the sound control part 20 and the microphone 21 of the digital camera 23. After the inputted direct inputting sound data are stored temporarily in the RAM 4, they are recorded through the built-in memory 5 or card control part 16 on the SD card 17.

Subsequently, when the user selects the inputted direct inputting sound as the additional information as well as the compression image data, in carrying out the required header processing in the normal photography as described above.

FIG. 2 illustrates one example of a recording format of the previously set character data.

The digital camera 23 is capable of setting a content of a plurality of items every the item as additional information. On or more contents of the items are recorded on the SD card 17 every the item as the previously set character data. Specifically, in FIG. 2, [1] company name, [2] belonging division, [3] belonging department, [4] end service, [5] end, correspond to the items and stock-companies R, A, B - - - H correspond to the company name of the item [1].

When the digital camera 23 is actuated by the power source being turned on, by the power source switch 39 (see FIG. 9), the previously set a character data stored in the SD card 17 are loaded and read in the RAM 4. Alternatively, the digital camera 23 is capable of displaying a content of at least one item as additional information.

Figure 3B:
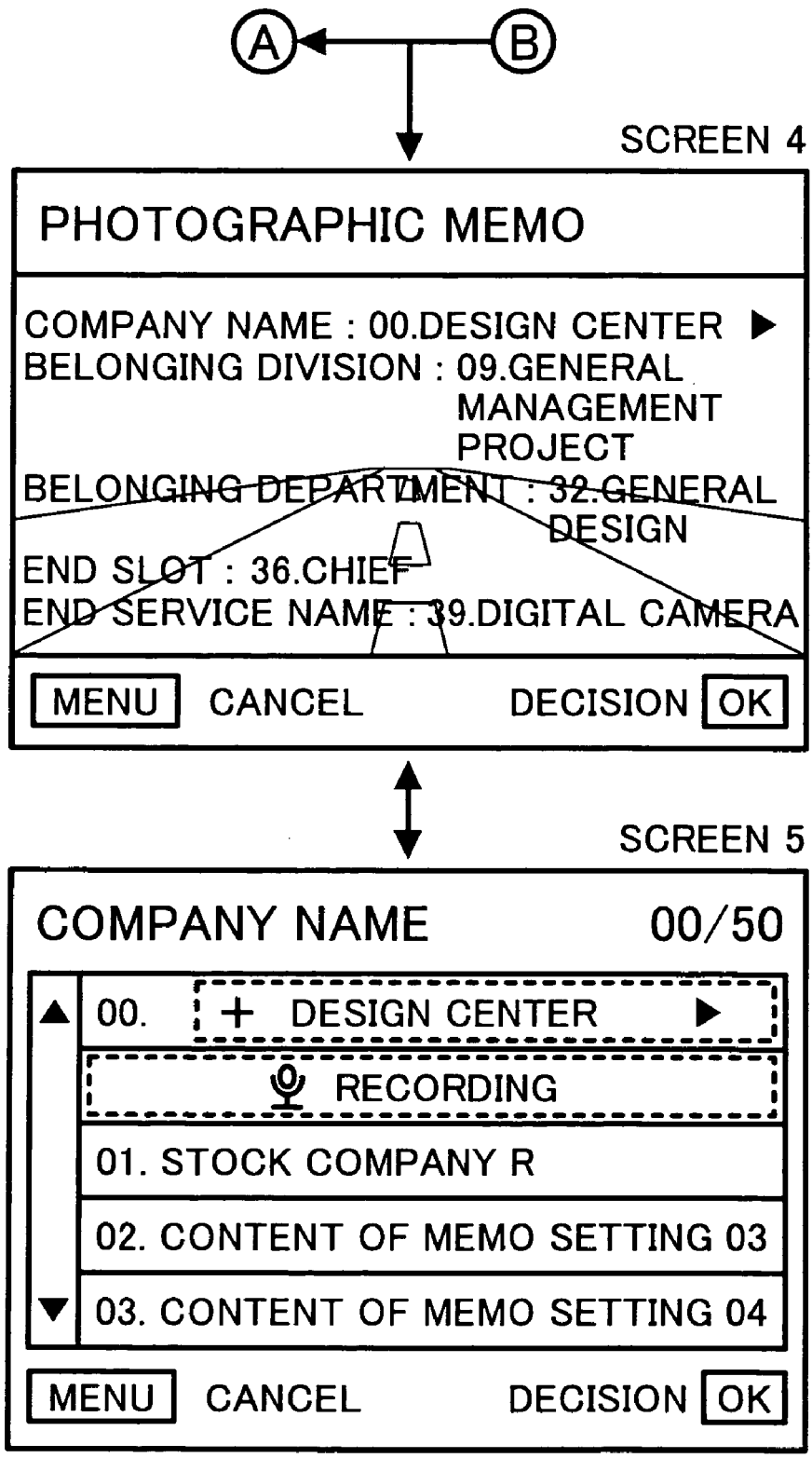
FIG. 3 is a view showing an operational flow for selecting and updating additional information.
Figure 3C:
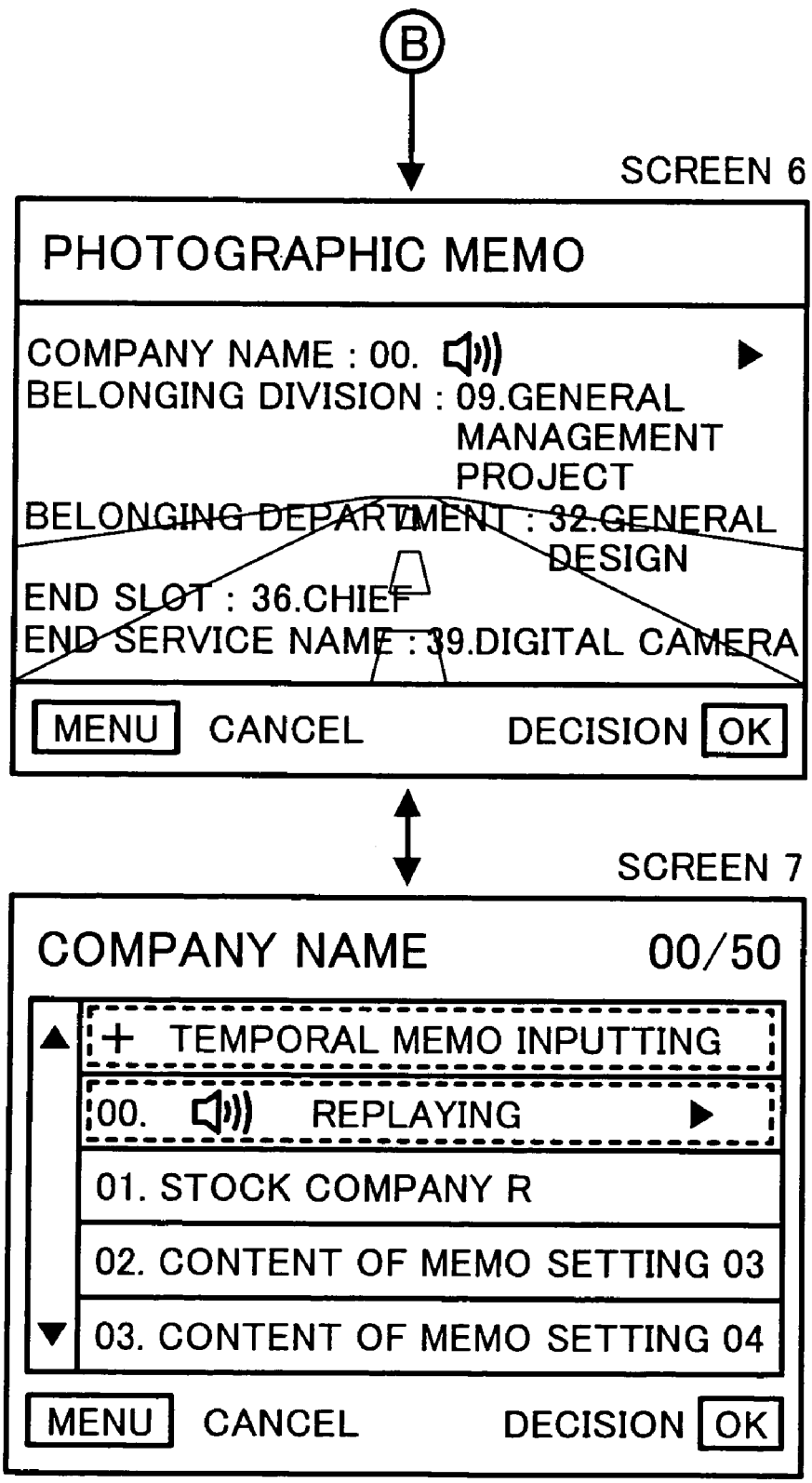

FIG. 3 illustrates an operational flow for selecting and updating the additional information.

In FIG. 3, a screen 1 is a monitoring display screen when taking a normal photography displayed on the LCD 38 (see FIG. 9), and in a state of the screen 1, the photography is executed by pressing the release shutter 31.

A screen 2 displays the items and the content of each item presently selected by a list display or displays at sight them, the "stock company R" of the previously set character data is selected as the item, "company name", in the screen 2. In the screen 2, the user can select any item by use of the upper and lower keys 32 and 33 and so on.

A screen 3 displays at sight or with a list display a list of one or more contents corresponding to the item "company name", namely, the content, "01. stock companies . . . 0 3. memo setting content 0 4" of the previously set character data, the content, 0 0. replaying of the direct inputting sound data and the content, "+temporal memo inputting" of the direct inputting character data. In the screen 3, the user can select any content by use of the upper and lower keys 32 and 33 and so on.

The movement from the screen 1 to the screen 2 is carried out by the OK/memo function ON-OF key 36, for example, the movement from the screen 2 to the screen 1 is carried out by the menu key 37 or the like, for example. In addition, in the state of the screen 2, after the items on the screen 2 a selected by use of the upper and lower keys 32 and 33 and so on, when clicking or deciding by the OK/memo function ON-OFF key 36, the screen 2 is shifted to the screen 3.

On the other hand, because the content of the previously set character data corresponding to the selected item, the content of the direct inputting sound data, and the content of the direct inputting character data are displayed in the screen 3, after any content is selected by the upper and lower keys 32 and 33 and so on, the screen 3 is returned to the screen 2 by deciding using the OK/memo function ON-OFF key 36 and so on.

The aforementioned screens 2 and 3 are configured to display unitarily one or more items of the additional information and the content corresponding to the item. Here, the meaning of "to unitarily display" is to display together on one screen, as displayed by a list display.

As described above, the content of the previously set character data previously recorded and set on the SD card 17 is selected as the content corresponding to the items, and the additional information stored in the header part of the image information when photographing is decided (a system for selecting and updating the additional information the previously set character data).

The present invention also makes it possible to select the direct inputting character data as the additional information, other than the previously set character data previously recorded and set on the SD card 17.

That is to say, in FIG. 3, a screen 4 displays with a list display the items and the content every each item presently selected, similarly as the screen 2, the screen 4 differs from the screen 2 in that the direct inputting character data, "DESIGN CENTER", not "stock company R" of the previously set character data, are selected as the content of the item, "company name", in the screen 4.

A screen 5 displays with a list display one or more contents corresponding to the item, "company name", similarly as the screen 3. In addition, "replaying" in the screen 3 and "recording" in the screen 5, displayed as the contents of the direct inputting sound data will be explained hereinafter.

Moreover, methods for selecting the screens 4 and 5 and for moving therebetween and so on are the same as the methods already described in the screens 2 and 3 and therefore a further detailed description is omitted, this is applied to the following, similarly to the above. The inputting of the direct inputting character data will be described below.

As described above, the content of the direct inputting character data inputted by the character memo function is selected as the contents corresponding to the items, and the additional information stored in the header part of the image information when photographing is decided (a system for selecting and updating the additional information—the previously set character data).

Furthermore, the direct inputting sound data can be selected as the additional information other than previously set character data and the direct inputting character data.

That is to say, in FIG. 3, a screen 6 displays with a list display the items and the content every each item presently selected, similarly as the screen 2, the screen 6 differs from the screen 2 in that the direct inputting sound data, not "stock company R" of the previously set character data, are selected as the content of the item, "company name", in the screen 6. In addition, a speaker mark displayed as the content of the item, "company name" on the screen 6 shows that the direct inputting sound data is selected.

A screen 7 display with a list display one or more contents corresponding to the item, "company name", similarly as the screen 3.

Moreover, methods for selecting the screens 6 and 7 and for moving therebetween and so on are the same as the methods already described in the screens 2 and 3. The inputting of the direct inputting sound data will be described below.

As described above, the content of the direct inputting sound data inputted by the sound memo function is selected as the contents corresponding to the items, and the additional information stored in the header part of the image information when photographing is decided (a system for selecting and updating the additional information—the direct inputting sound data).

FIG. 4 is a view showing an operational flow the inputting of the direct inputting sound data. In addition, screens 1, 2 and 3 in FIG. 4 are similar to the screens 1, 2 and 3 in FIG. 3.

When the direct inputting sound data are inputted, "recording" is selected on the screen 3 in FIG. 4 by use of the upper and lower keys 32 and 33 and then the OK/memo function ON-OFF key 36 is pressed. Therefore, an image plane for initiating the sound recording is displayed on the screen 4.

In the sate of the screen 4, the recording of sound is initiated by pressing the release shutter 31 or the like, the image plane showing "during sound recording" on the screen 5 is displayed. In the screen 5, after a predetermined time is lapsed or by the release shutter 31 being pressed, the sound recording is terminated and the screen 5 is shifted to the screen 6.

Figure 6B:
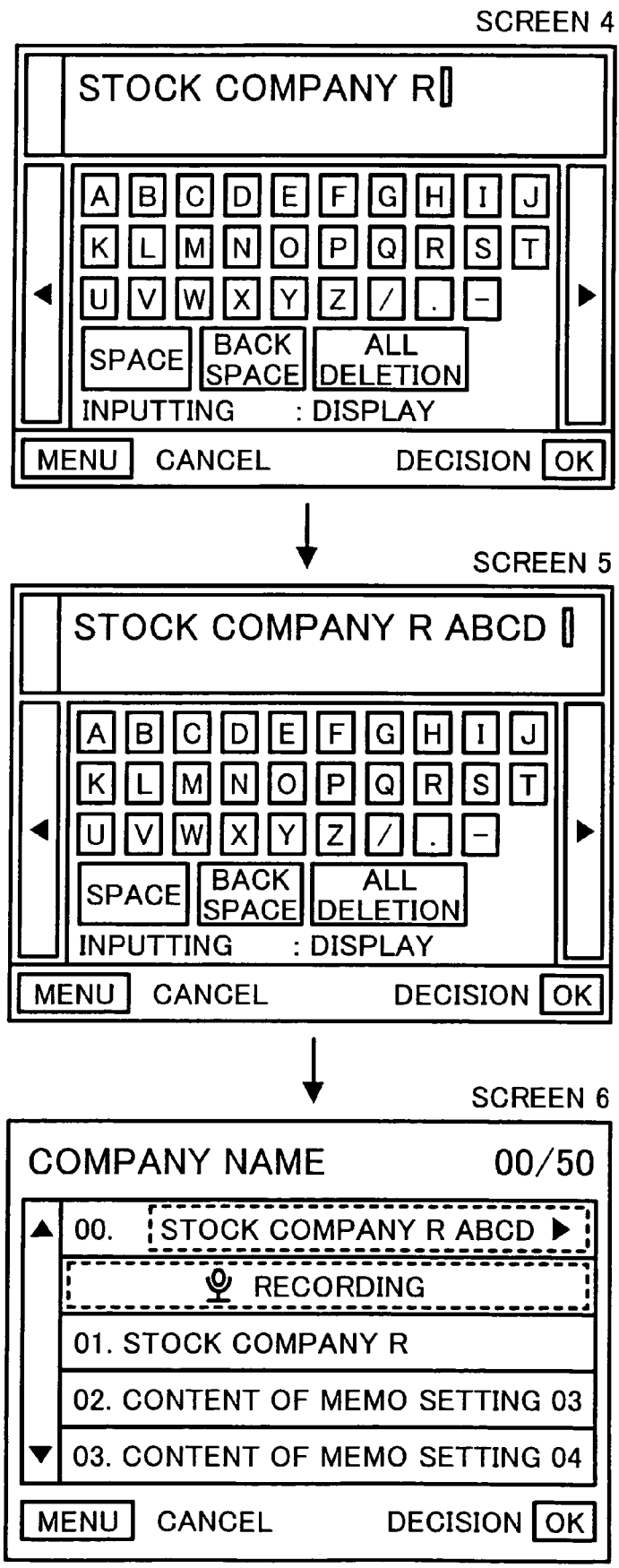
FIG. 6 is a view showing another a embodiment of the operational flow of inputting the direct inputting character data.

A difference between the screens 3 and 6 is presence and absence of the direct inputting sound data. As shown in FIG. 3, if there are no the direct inputting sound data, "recording" is displayed and if there are the direct inputting sold data as shown in FIG. 6, "replaying" is display.

In the screen 6, because the content of the previously set character data corresponding to the selected item, the content of the direct inputting sound data and the content of the direct inputting character data are displayed, similarly to the screen 3, after any content is selected by the upper and lower keys 32 and 33 and so on, the screen 6 is returned to the screen 2 by deciding by use of the OK/memo function ON OF key 36 and so on.

In addition, when the direct inputting sound data are replayed, if the sound recording is carried out once as described above, because the display is changed from "recording" on the screen 3 to "replaying" on the screen 6, the user selects "replaying" on the screen 6 by use of the upper and lower keys 32 and 33 and then presses the OK/memo function ON-OFF 36. As a result, the image plane of the sound replaying initiation on the screen 7 is displayed.

In the state of the screen 7, the replaying of sound is initiated by pressing the release shutter 31 and so on, for example, and the image plane showing "during recording replaying" on a screen 8 is displayed. In the screen 8, if the replaying of sound is completed, the screen 8 is shifted automatically to a screen 9. In the screen 9, whether or not re-recording of the direct inputting sound data is carried out is confirmed. When the user selects "YES" in the screen 9, the screen 9 is sized to the screen 4, on the other hand, when the "NO" is selected, the screen 9 is shifted to the screen 6. The selection of YES and NO is carried out by use of the right and left keys 35 and 34 and so on, for example and is decided by use of the OK/memo function ON-OFF key 36 and so on.

With the above, the direct inputting sound data can be inputted and information which is not recorded previously added to the image data by the sound data.

FIG. 5 is a view showing an operational flow of the inputting of the direct inputting character data. Note that the screen 1 in FIG. 5, a screen 2 and a screen 3 are similar to the screen 1, the screen 2 and the screen 3 in FIG. 3.

When the direct inputted character data are inputted, "temporal memo inputting" is selected by use of the upper and lower keys 32 and 33 in the screen 3 in FIG. 5 and then the OK/memo function ON-OFF key 36 is pressed. As a result, an image plane of a soft keyboard on the screen 4 is displayed. In the screen 4, the user can select character, blank, back space and all deletion and so on the soft keyboard by use of the upper and lower keys 32, 33 and the right and left keys 35, 34, for example. Character information inputted by the soft keyboard in a text area on an upper portion of the image plane of the soft keyboard is displayed as the screen 5 by input-operation on the soft keyboard by the user. After the use inputs the character information, when deciding by use of the OK/memo function ON-OFF key 36 and so on, for example, the screen 4 is shifted to the screen 6.

A difference between the screens 3 and 6 is presence and absence of the direct inputting character data. As shown in the screen 3, if there are no direct inputting character data, "temporal memo inputting" is displayed and if there ate the direct inputting character data as shown in the screen 6, the inputted character "DESIGN CENTER" is displayed.

In this way, the direct inputting character data can be inputted and information, which is not recorded and set previously can be added to the image data by the character data.

FIG. 6 is a view showing another example of the operational flow of the inputting of the direct inputting character data.

Comparing the example with the example shown in FIG. 6, a screen 4 and a screen 5 are only different the screen 4 and the screen 5, screens 1, 2, 3, and 6 are the same to the screens 1, 2, 3 and 6 in FIG. 5.

In the screen 4 in FIG. 6, a content of the previously set character data which are selected is displayed automatically on the text area of the upper portion on the image plane of the soft keyboard. The user operates the soft keyboard and edits the character information of the content displayed in the text area, thereby the character information inputted in the text area of the upper portion on the image plane of the soft keyboard, by the keyboard is displayed as the screen 5.

Also with the above, the direct inputting character data can be inputted, and information, which is not recorded and set previously can be added to the image data by the character data.

As understood from the above, according to the present invention, the items and contents of the character information added to the image, such as the previously set character information, the sound information recorded by the image scanning apparatus, the character information by the image scanning apparatus are unitarily displayed, and because the user can select and update freely the items and contents of the displayed additional information, the operationality of the user is very enhanced.

Moreover, because the information, which is not set, can be inputted with a sound or character, the addition of the information becomes easy and therefore the operationality of the user can be increased.

Further, because the information which is previously set can be updated, the change of the information becomes easy, and therefore the operationality of the user can be increased.

Furthermore, because the recording medium such as the SD card on which the previously set character data which are recorded is attachable to and detachable from the image scanning apparatus, it is possible to edit the character data by an outside device such as a personal computer and a connection of information between the outside device and image scanning apparatus is easy, whereby enhancing the operationality of the user.

What is claimed is:

1. An image scanning apparatus comprising:
  an image data scanning section for scanning image data;
  a sound recording section for recording sound data;
  a character inputting section for inputting second character data;
  a display selecting section for displaying unitarily an item of additional information to be added to image data taken by said image data scanning section and a content corresponding to said item, and for selecting the displayed additional information and updating the selected additional information; and
  a recording medium for recording as one file the additional information attached as a header of the image data taken in the image scanning section,
  wherein said additional information is composed of at least one of first character data previously set, the sound data recorded in said sound recording section and the second character data inputted in said character inputting section;
  said display selecting section further includes a sound inputting-updating portion for updating at least one portion of a composition of the selected additional information to the sound data recorded in the sound recording section, and
  the additional information selected and updated in the display selecting section is attached as the header of the image data taken in the image scanning section and is recorded in the recording medium as the one file.

2. The image apparatus according to claim 1, wherein said display selecting section further includes a character inputting-updating portion for updating at least one portion of a composition of the selected additional information to the second character data inputted in the character inputting section, and
  wherein the additional information selected and updated in the display selecting section is attached as the header of the image data captured in the image scanning section and is recorded in the recording medium as the one file.

3. The image scanning apparatus according to claim 1, wherein said display selecting section further includes a character inputting-updating portion for updating at least one portion of the first character data constituting the selected additional information to the second character data inputted in the character inputting section, and
  wherein the additional information selected and updated in the display select section is attached as the header of the image data taken in the image scanning section and is recorded in the recording medium as the one file.

4. The image scanning apparatus according to claim 1, wherein said first character data is inputted from an outside device.

5. The image scanning apparatus according to claim 1, wherein said recording medium is attachable and detachable.

6. The image scanning apparatus according to claim 1, wherein the additional information attached as the header of the image data taken in the image scanning section and recorded as the one file in the recording medium is readable and/or editable in an outside device.

* * * * *